United States Patent Office 3,112,292
Patented Nov. 26, 1963

3,112,292
PRODUCTION OF LINEAR CRYSTALLIZED
POLYCARBONATES
Ludwig Bottenbruch, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Filed June 17, 1959, Ser. No. 820,854
Claims priority, application Germany June 23, 1958
6 Claims. (Cl. 260—47)

The present invention is concerned with a process for the production of linear, crystallized polycarbonates.

Linear polycarbonates can be produced not only by the esterification of organic dihydroxy compounds with diesters of carbonic acid in the melt but also by the reaction of organic dihydroxy compounds with a derivative of carbonic acid such as phosgene or diesters of chlorocarbonic acid and organic dihydroxy compounds in the presence of acid-binding agents and preferably in the presence of inert organic solvents which dissolve the polycarbonates. In this way, there are obtained more or less highly viscous solutions of polycarbonates in these solvents.

In the hitherto described processes in which phosgene or chlorocarbonic acid diesters and the specified inert organic solvents are used, the solvent is removed by distillation or steam distillation from the resultant viscous solution, possibly after its separation from another phase, such as an aqueous phase, and usually after washing with water, whereupon a solid, soft, elastic mass remains behind, or the polycarbonate is precipitated from the viscous solution by the addition of a solvent miscible with the first solvent used but which, nevertheless, does not dissolve the polycarbonate. However, both working procedures involve considerable difficulties in their technical performance.

We have now found that, in many cases, the polycarbonates possess such a great ability to crystallize by the use of suitable solvents that they can be crystallized from the viscous solutions if the solutions are allowed to stand long enough. The solutions then solidify to hard, but nevertheless friable masses which can easily be broken up. The solvent can be removed very easily from the granulates obtained in this manner, for example, by heating in a drying apparatus or by heating in water or a solvent which does not dissolve the polycarbonates.

The improved process according to the present invention for the production of linear crystallized polycarbonates by the reaction of organic dihydroxy compounds with phosgene or with diester of chlorocarbonic acid and organic dihydroxy compounds in the presence of acid-binding agents, is characterized by carrying out the reaction in the presence of an inert organic solvent which dissolves the polycarbonates and from which the polycarbonates crystallize out, the initially obtained viscous solution of the polycarbonates in such a solvent, if desired, after isolation, washing and concentration of the same, being allowed to stand until they change by crystallization of the polycarbonates into a hard, friable mass, this mass then being broken up and the solvent removed therefrom.

For the production of high molecular weight linear polycarbonates according to the present invention there may be used, as organic dihydroxy compounds aliphatic and cycloaliphatic dihydroxy compounds of the kind exemplified by ethylene glycol, polyethylene glycols, o, m, and p - xylylene glycols, thiodiglycol, propanediol - 1,3, butanediol-1,3, butanediol-1,4, hexanediol-1,6, decanediol-1,10, cyclohexanediol-1,4, and 2,2-(4,4'-dihydroxydicyclohexane)-propane, and aromatic dihydroxy compounds such as hydroquinone, resorcinol, pyrocatechol, 4,4' - dihydroxy - diphenyl, 1,4 - dihydroxy - naphthalene, dihydroxy-anthracene, and particularly bisphenolic compounds of the kind exemplified by dihydroxy-diarylene alkanes and cycloalkanes, for instance, 2,2-(4,4'-dihydroxy - diphenyl - phenylene) - propane, butane, pentane, and hexane, 2,2 - (4,4' - dihydroxy - 3,3',5,5'-tetrachlorophenylene) - propane, 4,4' - dihydroxy - 3,3'-dicarboxy - diphenylene methane, 2,2 - [4,4' - dihydroxy - diphenylene - disulfonic acid - (3,3')] - propane, by dihydroxy-diarylene sulfones, for instance, 4,4'-dihydroxy-phenylene sulfone, by dihydroxy-diarylene ethers and thioethers, for instance, 4,4'-dihydroxy-diphenylene ether and 4,4'-dihydroxy-diphenylene sulfide, and by dihydroxy-diarylene sulfoxides, for instance, 4,4'-dihydroxy-diphenylene sulfoxide, as described in our copending patent applications—

Ser. Nos.:
461,938, filed October 12, 1954 (now Patent No. 3,028,365)
557,256, filed January 4, 1956
572,802, filed March 21, 1956
572,793, filed March 21, 1956
583,382, filed May 8, 1956
662,013, filed May 28, 1957
688,822, filed October 8, 1957
699,194, filed November 27, 1957

Especially suitable polycarbonates are those obtained from dihydroxy-diarylene alkanes alone or from these alkanes or of other aromatic dihydroxy compounds mentioned above in admixture with aliphatic or/and cycloaliphatic dihydroxy compounds. A suitable acid-binding agent is an aqueous alkali-metal hydroxide solution such as a sodium hydroxide solution. Nevertheless there also may be used aqueous alkaline-earth-metal hydroxide solutions or suspensions, for instance, those of calcium hydroxide; furthermore, organic bases, particularly tertiary amines, such as triethylamine and pyridine. In general, it is most advantageous to carry out the production of the polycarbonates in the presence of an aqueous alkali-metal hydroxide solution and adding a small amount of a tertiary amine as described in our copending application Ser. No. 557,256.

Solvents of the type to be used are, for example, methylene chloride, chloroform, ethylene chloride, chlorobenzene, benzene, toluene, xylene, ethyl acetate, butyl acetate, glycol monoethyl and monomethyl ether acetates, dibutyl ether and anisole. The suitable solvent for any particular case can easily be ascertained by simple experiments.

If, for example, the polycarbonate is produced from 2,2-(4,4'-dihydroxydiphenylene)propane in the presence of methylene chloride and sodium hydroxide solution by passing in phosgene, then a viscous solution of the polycarbonate is obtained from which alkali and salts can be removed by washing. The highly viscous, paste-like, completely plastic mass obtained after washing solidifies to a solid mass by standing at room temperature and, after 8–10 hours at a suitable concentration, solidifies to a solid, friable mass which can now be broken up to a granulate from which the solvent can be removed by heating without the mass melting or agglomerating.

On the other hand, the polycarbonate from 2,2-(4,4'-dihydroxy-3,3',5,5' - tetrachlorodiphenylene)propane dissolved in methylene chloride shows only a slight tendency to crystallize. However, if toluene is used as solvent then, in this case, a hard mass is obtained by crystallization which can be ground to a crystalline polymer.

The tendency to crystallize of the dissolved polycarbonates increases with increasing concentration of the polycarbonates in the solution. The limit of the concentration is determined by the viscosity of the solution at which a working up with the usual type of apparatus is no longer possible. Suitable concentrations of the carbonates in the solvents lie in general between about 10 and about 60 percent. Since the viscosity of the solution falls considerably with increasing temperature, often it is usually expedient to carry out the operations immediately prior to the crystallization at elevated temperatures in order to be able to work with higher concentrations of polycarbonates.

Thus temperatures up to about 120 to 130° C. may be used, especially in connection with superatmospheric pressures to prevent evaporation of the solvent.

If desired, a small amount of a solvent in which polycarbonates are not substantially soluble can also be added to the washed solution or, as already mentioned, a portion of the solvent can be evaporated, possibly at an elevated temperature and/or reduced pressure, in order to accelerate the crystallization. Solvents which do not dissolve polycarbonates and which may be added to the washed polycarbonate solutions to promote the crystallization of the polycarbonates are, for instance, aliphatic hydrocarbons, such as benzine, ligroin, petroleum ether, cycloaliphatic hydrocarbons, such as cyclohexane and methylcyclohexane, lower aliphatic alcohols, such as methanol, ethanol, propanol, and n-butanol and isobutanol, and ketones, such as acetone.

The following examples are given for the purpose of illustrating the present invention:

*Example 1*

The highly viscous, paste-like solution of the polycarbonates (relative viscosity 1.75) obtained by the reaction of 137.5 grams of bisphenol A (2,2-bis(4-hydroxyphenyl)-propane) and 0.8 gram p-tert.butylphenol with phosgene in a solution of sodium hydroxide and 330 grams of methylene chloride as solvent is washed with water until free of electrolytes. The initially still plastic mass solidifies in the course of 6–8 hours to a solid product which can be broken up in a chopping machine and, by heating in water with stirring, freed from solvent. After removing the water from the still moist material by suction, it is subsequently dried.

*Example 2*

The highly viscous solution of the polycarbonate (relative viscosity 1.63) obtained by the reaction of 123.8 grams of 2,2-bis(4-hydroxyphenyl)propane (90 mol percent), 14.6 grams 2,2-bis(4-hydroxyphenyl)butane (10 mol percent), and 0.6 gram p-tert.butylphenol with phosgene in a solution of sodium hydroxide and 330 grams of methylene chloride is washed with water until free of electrolytes. The paste obtained solidifies in 8–10 hours to a hard, friable mass which is broken up, freed from solvent and dried in the manner described in Example 1.

*Example 3*

The highly viscous solution of the polycarbonate (relative viscosity 1.73) obtained by the reaction of 123.8 grams of 2,2-bis(4-hydrophenyl)propane (90 mol percent) 11.2 grams of 4,4'-dihydroxydiphenyl (10 mol percent and 0.8 gram p-tert.butylphenol with phosgene in a solution of sodium hydroxide and 330 grams of methylene chloride is washed with water until free of electrolytes, the soft, completely plastic solution changing after 4–6 hours into a hard, friable mass which is broken up, freed from solvent and dried as described in Example 1.

*Example 4*

The highly viscous solution of the polycarbonate (relative viscosity 1.45) obtained by the reaction of 178.6 grams of 2,2-bis(3,5-dichloro-4-hydroxyphenyl)propane and 0.2 gram of o-chlorophenol with 71.6 grams phosgene in a solution of sodium hydroxide and 330 grams of toluene is freed of electrolytes by washing with water in a kneader. The washed solution solidifies in 12–14 hours to a hard opaque mass which is broken up. The granulate obtained is dried in a drying chamber, the temperature being gradually increased from room temperature to 120° C.

*Example 5*

The highly viscous solution of the polycarbonate (relative viscosity 1.48) obtained by the reaction of 11.9 grams of 4,4'-dihydroxy-diphenyl sulfide, 20.6 grams 2,2-bis(4-hydroxyphenyl)propane and 0.6 gram p-tert.butylphenol with 71.6 grams of phosgene in the presence of aqueous caustic soda solution as acid-binding agent and 360 grams of methylene chloride as solvent is washed with water until free of electrolytes. After 4 hours the solution solidifies and crumbles into pieces which are pulverized to the desired size and dried at 120° C.

*Example 6*

The viscous solution of the polycarbonate (relative viscosity 1.35) obtained by the reaction of 54.6 grams of the diesters of chlorocarbonic acid and 2,2-bis(4-hydroxyphenyl)propane with 35.2 grams of 2,2-bis(4-hydroxyphenyl)propane in the presence of pyridine as acid-binding agent and 150 grams of methylene chloride as solvent is washed with diluted hydrochloric acid and water until free of pyridine and pyridine hydrochloride. After about 8 hours, calculated from the beginning of the washing, the homogeneous solution solidifies into a hard mass which is pulverized as described in Example 1 and freed from solvent.

*Example 7*

A solution of a polycarbonate (relative viscosity 1.32) in methylene chloride obtained by the reaction of 137.6 grams of 2,2-bis(4-hydroxyphenyl)propane and 2.5 grams p-tert.butylphenol with 51.6 grams of phosgene in the presence of aqueous caustic soda solution as acid-binding agent and 800 grams of methylene chloride as solvent is washed with water until free of electrolytes. From the resulting solution having a relatively low viscosity, 450 grams of solvent is distilled off with stirring on a water bath. The solution becomes highly viscous and hardens within some hours to a hard opaque mass which is broken up and dried as described in Example 1.

*Example 8*

A solution of a polycarbonate (relative viscosity 1.37) in methylene chloride obtained by the reaction of 137.6 grams of 2,2-bis(4-hydroxyphenyl)propane and 2.0 grams p-tert.butylphenol with 71.6 grams of phosgene in the presence of an aqueous caustic soda solution as acid-binding agent and 850 grams of ethylene dichloride(1,2-dichloroethane) as solvent is washed with water until free of electrolytes. Then 375 grams of ligroin is added to the clear solution with stirring. After about 8 hours there is obtained a hard opaque mass which is broken up and dried under reduced pressure while slowly increasing the temperature to about 120° C.

If ligroin is not added to the ethylene chloride solution after washing, even after some days, only a small quantity of the polycarbonate is crystallized, so that the solution forms a thin gelatinous mass.

We claim:
1. A process for the production of a linear polycarbonate having a high molecular weight in the form of solid crystalline particles which comprises
   (a) reacting together, in the presence of an acid-binding agent and in solution in an inert organic solvent for the polycarbonate that is to be formed, an organic dihydroxy compound with a reactant of the group consisting of phosgene and diesters of chlorocarbonic acid and organic dihydroxy compounds in such quantities as to produce a highly viscous concentrated solution of the polycarbonate,
   (b) washing the resulting solution of polycarbonate with water until it is essentially free of electrolytes,
   (c) allowing the resulting washed viscous solution to stand for such a period until it solidifies spontaneously to an essentially rigid but friable crystalline mass which includes the solvent, and (d) subsequently pulverizing the said friable solid mass and removing the solvent therefrom.

2. A process as defined in claim 1 in which the organic dihydroxy compounds are bisphenols of the group consisting of bis(hydroxyaryl)alkanes.

3. A process as defined in claim 1 in which the organic dihydroxy compound is 2,2-bis(4-hydroxyphenyl)propane.

4. A process as defined in claim 1 in which the inert solvent is methylene chloride.

5. A process as defined in claim 1 in which the acid-binding agent is an aqueous alkali-metal hydroxide solution.

6. A process as defined in claim 1 in which the solvent is selected from the group consisting of methylene chloride, chloroform, ethylene dichloride, chlorobenzene, benzene, toluene, xylene, ethyl acetate, butyl acetate, glycol monoethyl ether acetate, glycol monomethyl ether acetate, dibutyl ether and anisole.

References Cited in the file of this patent

UNITED STATES PATENTS

| | | |
|---|---|---|
| 2,950,266 | Goldblum | Aug. 23, 1960 |
| 2,964,797 | Peilstocker | Dec. 20, 1960 |
| 3,023,101 | Ossenbrunner et al. | Feb. 27, 1962 |

OTHER REFERENCES

British Plastics, March 1958, pp. 112–114.
Chemical Week, June 1, 1957, pages 57 and 60.